United States Patent
Kaneko et al.

(10) Patent No.: US 7,839,583 B2
(45) Date of Patent: Nov. 23, 2010

(54) CAM FOLLOWER FOR LENS BARREL AND LENS BARREL

(75) Inventors: Shuhei Kaneko, Hino (JP); Daisuke Shiraishi, Hachioji (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 184 days.

(21) Appl. No.: 12/183,913

(22) Filed: Jul. 31, 2008

(65) Prior Publication Data

US 2009/0052069 A1 Feb. 26, 2009

(30) Foreign Application Priority Data

Aug. 22, 2007 (JP) ............................. 2007-216418

(51) Int. Cl.
 *G02B 7/02* (2006.01)
(52) U.S. Cl. .................. 359/819; 359/821; 359/822
(58) Field of Classification Search .............. 359/819, 359/821, 822, 823, 824, 826
See application file for complete search history.

(56) References Cited

U.S. PATENT DOCUMENTS 7,538,960 B2 * 5/2009 Schwab et al. .............. 359/822
2002/0005993 A1 * 1/2002 Koiwai ....................... 359/700

FOREIGN PATENT DOCUMENTS

JP 2000-131588 5/2000
JP 2007-114540 5/2007

* cited by examiner

*Primary Examiner*—Timothy J Thompson
(74) *Attorney, Agent, or Firm*—Straub & Pokotylo; John C. Pokotylo

(57) ABSTRACT

A lens barrel has a first group frame, cam followers each having a shaft portion having a straight hollow hole and a slidably contacting portion integral with the shaft portion, which are fixed to the first group frame and a rotating frame having a cam groove with which the cam followers are in slidable contact, which moves relatively to the first group frame. The hollow hole of the cam follower reaches the inside portion of the slidably contacting portion. The shaft portion is press-fit fixed in the shaft hole of the first group frame when an impact force is applied to the lens barrel, the possibility of damaging the frame member is little.

12 Claims, 5 Drawing Sheets

CAM FOLLOWER FOR LENS BARREL AND LENS BARREL

CROSS REFERENCE TO RELATED APPLICATION

This application claims benefit of Japanese Application No. 2007-216418 filed in Japan on Aug. 22, 2007, the contents of which are incorporated by this reference.

BACKGROUND OF THE INVENTION

1. Field of the Invention

The present invention relates to a cam follower that engages with a cam (groove) for advancing and retracting a frame member of a lens barrel and the construction of the lens barrel to which the cam follower is applied.

2. Description of the Related Art

As a conventional lens barrel, a lens barrel in which a frame member is advancingly and retractingly driven in the optical axis direction by a cam groove and a cam follower has been known. On the lens barrel disclosed, for example, in Japanese Patent Application Laid-Open Publication No. 2000-131588, the cam groove provided in a cam frame and the cam follower that is fixed to a moving frame member and slidably fitted in the cam groove are provided, and the moving frame member is advancingly and retractingly driven along with the rotation of the cam frame. The cam follower is in slidable contact with the cam groove, and has a slidably contacting portion formed by a taper surface and a solid shaft portion fittingly fixed by press fitting or bonding in a shaft hole in the moving frame member.

For example, when being incorporated in a camera as a zoom lens, in the photographing state, the conventional lens barrel becomes in the state in which a front group lens frame members of the lens barrel are put out in succession from a camera external body to the front. Assuming that the cam follower is made of a metal and the moving frame member is made of a synthetic resin, in case of accident in which the camera is dropped and the front group lens frame member is brought into contact with an obstacle, naturally, an impact force (external force) along the optical axis O direction acts on the cam groove and the cam follower.

FIG. 8 shows a cross section around the cam groove and the cam follower in the conventional lens barrel. In this figure, a cam follower 53 on a moving frame 52 side is slidably fitted in a cam groove 51a in a cam frame 51. The state of stress concentration in a shaft hole of the moving frame at the time when a predetermined impact force (external force) F0 acts on the lens barrel is analyzed by using a computer, and a stress distribution formed around the shaft hole is additionally shown in FIG. 8.

Specifically, the cam follower 53 includes a slidably contacting portion 53a formed by a taper surface, which comes into slidable contact with the cam groove 51a, and a solid shaft portion 53b. The shaft portion 53b is fittingly fixed in a shaft hole 52a of the moving frame 52. According to the aforementioned computer analysis, in the case where the impact force F0 acts, as shown in FIG. 8, stresses a1 to a7 are created on the side of the shaft portion 53b on which the external force acts, and stresses a3 to a8 are created on the opposite side thereof. The stress aN in each zone shows a stress value that decreases gradually in the order of N=1 to N=8.

SUMMARY OF THE INVENTION

A lens barrel and a cam follower for the lens barrel in accordance with the present invention has the following feature: when an impact force is applied to the lens barrel, the cam follower fixed to a frame member is less liable to come off the frame member, and the possibility of damaging the frame member is also little. The cam follower for a lens barrel, which is one invention of the present invention, has a hollow shaft portion for fixing the cam follower to the frame member of the lens barrel and a slidably contacting portion integral with the hollow shaft portion, which is in slidable contact with a cam or a groove of another frame member moving relatively to the frame member to which the shaft portion is fixed.

The lens barrel, which is another invention of the present invention, has a first frame member that moves, a hollow shaft portion, and a slidably contacting portion integral with the shaft portion, the cam follower, the shaft portion of which is fixed to the first frame member, and a second frame member that is in slidable contact with the slidably contacting portion of the cam follower and moves relatively to the first frame member.

Other features and advantages of the present invention will become apparent from the following description.

DETAILED DESCRIPTION OF THE PREFERRED EMBODIMENTS

Embodiments of the present invention will now be described with reference to the accompanying drawings.

Figure 1:
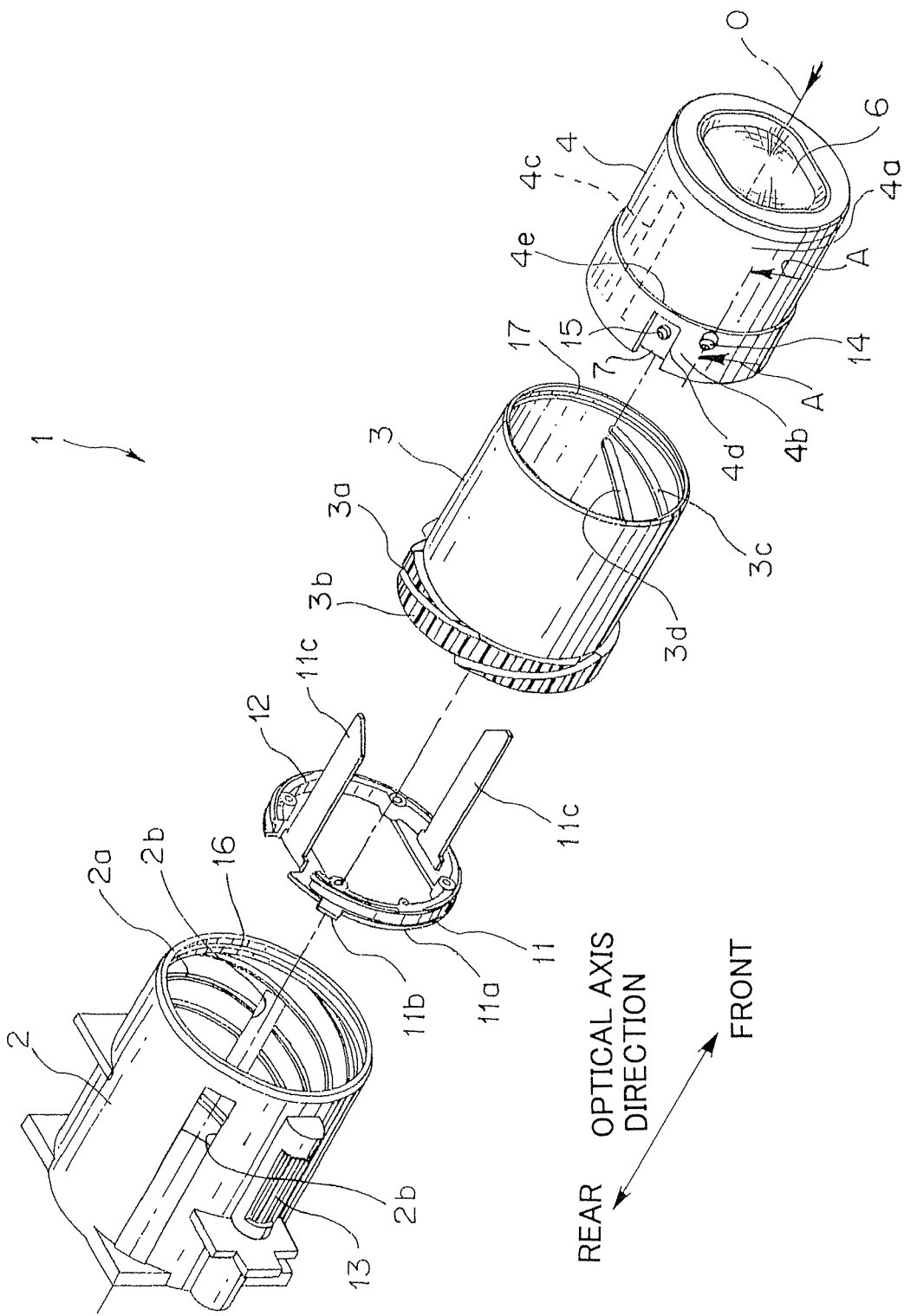
FIG. 1 is an exploded perspective view of a lens barrel in accordance with a first embodiment of the present invention.
Figure 2:
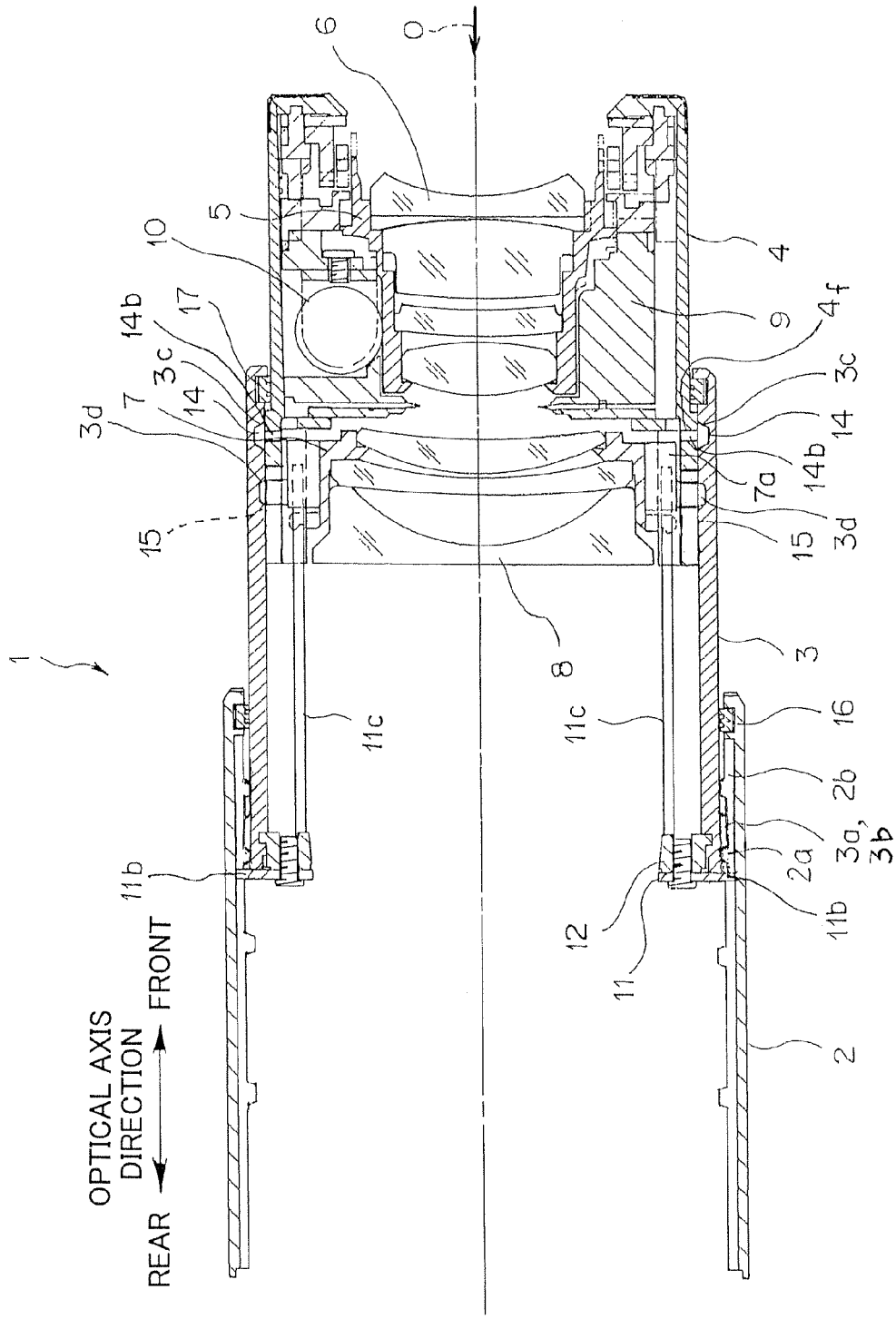
FIG. 2 is a sectional view taken along the optical axis, showing a state in which the lens barrel shown in FIG. 1 is telescoped.
Figure 3:
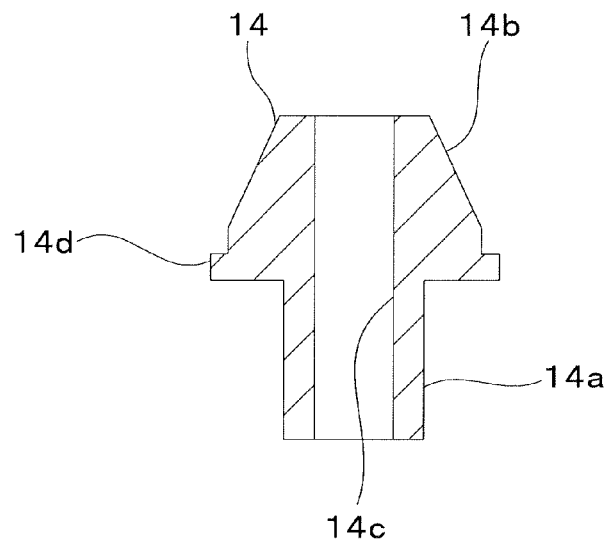
FIG. 3 is a sectional view of a cam follower applied to the lens barrel shown in FIG. 1.
Figure 4:
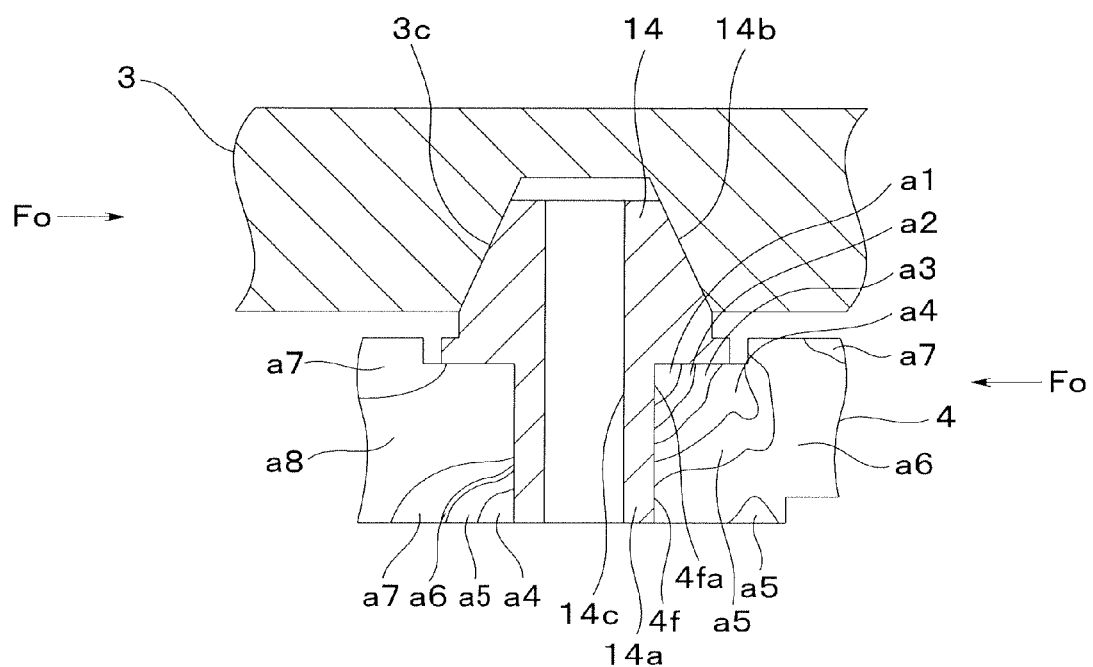
FIG. 4 is an enlarged sectional view taken along the optical axis around a cam groove and a cam follower of the lens barrel shown in FIG. 1, additionally showing a stress distribution formed around a shaft hole in a moving frame, which is obtained by computer analysis of the state of stress concentration in the shaft hole at the time when a predetermined impact force acts.

FIG. 1 is an exploded perspective view of a lens barrel in accordance with a first embodiment of the present invention. FIG. 2 is a sectional view taken along the optical axis, showing the state in which the lens barrel is telescoped. FIG. 3 is a sectional view of a cam follower applied to the lens barrel. FIG. 4 is an enlarged sectional view taken along the optical axis around a cam groove and a cam follower of the lens barrel, additionally showing a stress distribution formed around a shaft hole in a moving frame, which is obtained by computer analysis of the state of stress concentration in the shaft hole at the time when a predetermined impact force F0 acts to the lens barrel.

A lens barrel 1 of the present embodiment is capable of being subjected to variable power driving due to a zoom driving system, and has, as shown in FIGS. 1 and 2, a fixed frame 2 fixedly supported on a camera body, a rotating frame 3, which is a second frame member, fittingly supported in the fixed frame 2 so as to be rotatable and capable of being advanced and retracted, a first group frame 4, which is a first frame member, supported in the rotating frame 3 to hold a first group lens 6, a second group frame 7 supported in the first group frame 4 to hold a second group lens 8, and a float key 11 supported in the rotating frame 3 to regulate the rotation of the first and second group frames 4 and 7.

In the explanation including the later-described embodiments, the optical axis of photographing lens (the first and second group lenses) is taken as O, and the object side in the optical axis O direction is taken as front and the image formation side as rear.

The fixed frame 2, which is a frame member having a cylindrical shape, is provided with a female helicoid 2a provided in the inner peripheral portion thereof and two straight grooves 2b extending along the optical axis O direction. Also, the fixed frame 2 incorporates a driving gear 13 having a rotation shaft along the optical axis O direction. In the front end inner peripheral portion of the fixed frame 2, a seal ring 16 having dustproof, waterproof, and light shielding functions, on which the outer periphery of the rotating frame 3 slides, is fitted.

The rotating frame 3, which is a resin-made frame member having a cylindrical shape, is provided, in the rear end outer peripheral portion thereof, with a male helicoid 3a engaging with the female helicoid 2a of the fixed frame 2 and a gear portion 3b meshing with the driving gear 13 so that these two elements overlap. Also, in the inner peripheral portion thereof, cam grooves 3c and 3d, which are two sets of three cams (grooves), extending slantwise with respect to the optical axis O direction are provided (FIG. 1 shows only one groove for each set). Each of the cam grooves 3c and 3d is a bottomed groove having a tilting surface necessary for mold release at the time of molding (FIG. 4). Also, in the front end inner peripheral portion of the rotating frame 3, a seal ring 17 having dustproof, waterproof, and light shielding functions, on which the outer periphery of the first group frame 4 slides, is fitted.

The rotating frame 3 is rotatingly driven via the gear portion 3b by the driving gear 13, and advances and retracts in the optical axis O direction via the female helicoid 2a and the male helicoid 3a while turning with respect to the fixed frame 2.

The first group frame 4, which is a resin-made frame member having a cylindrical shape, is fitted in the inner peripheral portion of the rotating frame 3 in a state of being rotatable relatively and capable of advancing and retracting. The first group frame 4 includes a body portion 4a on the front side and a cam follower holding portion 4b on the rear side. In the first group frame 4, a lens holding frame 5 is fixed, and in the lens holding frame 5, the first group lens 6, a focusing driving unit 9, and a shutter unit 10 are incorporated (FIG. 2).

A level difference portion 4e is provided between the outer peripheral surface of the cam follower holding portion 4b and the outer peripheral surface of the body portion 4a. The cam follower holding portion 4b is provided with a cam follower fitting shaft hole 4f (FIG. 4). At the side of the shaft hole 4f, a notch portion 4d for inserting cam followers 15 of the second group frame 7 is arranged.

In the inner peripheral portion of the first group frame 4, straight guide grooves 4c extending along the optical axis O direction, in which the float key 11 is slidably fitted, are provided. Also, in the inner peripheral portion thereof, a straight guide groove (not shown) for regulating the rotation of the second group frame 7 is provided.

Three cam followers 14 (FIG. 1 shows only one cam follower) fixed in the outer peripheral portion of the cam follower holding portion 4b are made of a metal such as free cutting steel. Each of the cam followers 14 has a pipe-shaped hollow shaft portion 14a fixed in the cam follower fitting shaft hole 4f by press fitting (or bonding), a slidably contacting portion 14b forming a taper-shaped slidably contacting surface that is in slidable contact with the cam groove 3c of the rotating frame 3, and a flange portion 14d. The shaft portion 14a is provided with a straight-shaped hollow hole 14c therein, so that the shaft portion 14a has a thin wall. The hollow hole 14c penetrates the shaft portion 14a and the slidably contacting portion 14b (FIG. 3). The flange portion 14d is not necessarily needed.

The second group frame 7, which is a resin-made frame member having a cylindrical shape, is fitted in the inner peripheral portion of the first group frame 4 in a state of being capable of regulating the rotation and capable of advancing and retracting. In the inner peripheral portion of the second group frame 7, the second group lens 8 is held, and in the outer peripheral portion thereof, the three cam followers 15 are arranged. Each of the cam followers 15 engages with the cam groove 3d of the rotating frame 3 in a slidable state.

The float key 11 has two protrusion-shaped keys 11c extending from a ring portion having a central opening to the front in the optical axis O direction and two guide protrusions 11b projecting from the ring portion to the outer periphery side. In the ring portion, a guide ring 12 extending in the circumferential direction is fixed.

The float key 11 is assembled by fitting the guide ring 12 in a circumferential guide groove (not shown) of the rotating frame 3 in a state of being rotatable relative to the rear end portion of the rotating frame 3, and by slidably fitting the guide protrusions 11b in the straight grooves 2b of the fixed frame 2. Therefore, when the rotating frame 3 advances or retracts in the optical axis O direction while rotating, the float key 11 moves straight in the optical axis O direction together with the rotating frame 3 in the state in which the turning thereof is regulated by the fixed frame 2.

The keys 11c of the float key 11 is slidably fitted in the guide grooves 4c of the first group frame 4. Therefore, the first group frame 4 is fittingly supported by the rotating frame 3 in the state in which the turning thereof with respect to the fixed frame 2 is regulated by the float key 11, and is advancingly and retractingly driven in the optical axis O direction by the cam groove 3c along with the turning of the rotating frame 3. Meanwhile, the second group frame 7 is also supported in the first group frame 4 in the state in which the turning thereof is regulated, and is advancingly and retractingly driven in the optical axis O direction by the cam groove 3d of the rotating frame 3.

When a camera incorporating the lens barrel 1 of the above-described embodiment is in a non-photographing state, both of the rotating frame 3 and the first group frame 4 are in a state of being put in the fixed frame 2. When the driving gear 13 is rotatingly driven in a predetermined direction to make the camera in the state in which photographing can be performed, the rotating frame 3 is put out in the optical axis O direction from the fixed frame 2 to the front while rotating. The first group frame 4 is put out to a position at which photographing can be performed in the front of the rotating frame 3 in the state in which the turning thereof is regulated. The second group frame 7 moves to a position at which photographing can be performed in the first group frame 4. Thereafter, the lens barrel 1 is advancingly and retractingly driven to a zooming position by the driving gear 13 as necessary, by which photographing is executed.

For the lens barrel 1 of the present embodiment, as described above, when the camera is in the state in which photographing can be performed, the first group frame 4 has moved to a put-out position projecting to the front. In case of accident in which the camera is dropped with the lens barrel side (front side) being the downside, the front end surface of the first group frame 4 collides with an obstacle such as the ground, and resultantly the lens barrel 1 is subjected to an impact force (external force) F0 in the optical axis O direction. The impact force F0 acts on the engagement portion in which the shaft portion 14a of the cam follower 14 engages with the shaft hole 4f of the first group frame 4.

Figure 8:
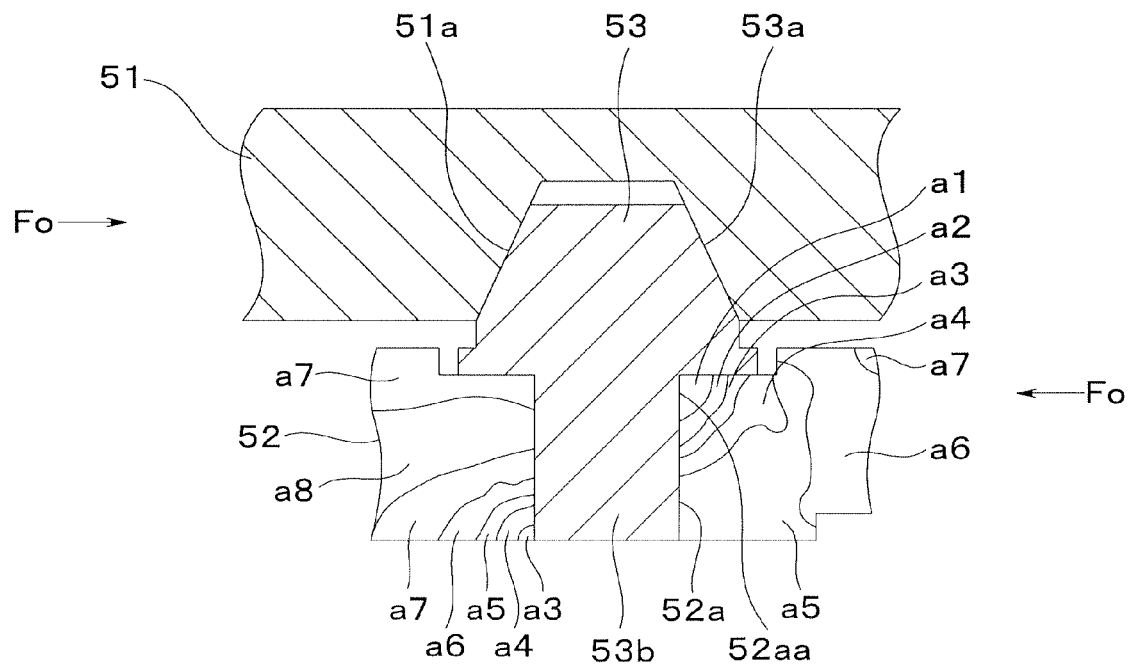
FIG. 8 is an enlarged sectional view taken along the optical axis around a cam groove and a cam follower of a conventional lens barrel, additionally showing a stress distribution formed around a shaft hole in a moving frame, which is obtained by computer analysis of the state of stress concentration in the shaft hole at the time when a predetermined impact force acts.

As shown in FIG. 4 showing a stress distribution at the time of application of the impact force F0 obtained by computer analysis, as compared with the case where the conventional solid cam follower 53 shown in FIG. 8 is applied, the degree of stress concentration near a fit inlet portion 4fa that is a mouth on the side of application of the external force of the shaft hole 4f is relaxed. The stress aN (N=1 to 8) in each zone shown in FIG. 4 shows the same value as that of the aforementioned stress aN in FIG. 8, and the stress value decreases gradually from N=1 toward N=8.

The reason why the degree of stress concentration decreases in the case where the cam follower 14 is applied as described above is that when the impact force F0 is applied, the shaft portion 14a is deformed elastically to relieve the impact force because the shaft portion 14a is hollow as compared with the aforementioned conventional cam follower 53 having the solid shaft portion.

As described above, in the lens barrel 1 of the present embodiment, the shaft portion 14a of the cam follower 14 fixed in the shaft hole 4f of the first group frame 4 is a thin-wall and straight hollow shaft. Therefore, when the lens barrel 1 is subjected to the impact force, the shaft portion 14a is deformed elastically in addition to the elastic deformation of the shaft hole 4f, by which the impact force is relieved. Therefore, the stress concentration of the shaft hole 4f of the first group frame 4 in which the shaft portion 14a is fittingly fixed decreases, and the strength around the shaft hole 4f is secured, by which the coming-off of the cam follower 14 and the damage to the shaft hole 4f can be prevented. As a result, the length of the shaft hole 4f can be decreased, so that the compactness of the lens barrel can be realized by decreasing the outside diameter of the first group frame 4.

Next, a cam follower in accordance with a second embodiment of the present invention is explained with reference to FIGS. 5 and 6.

Figure 5:
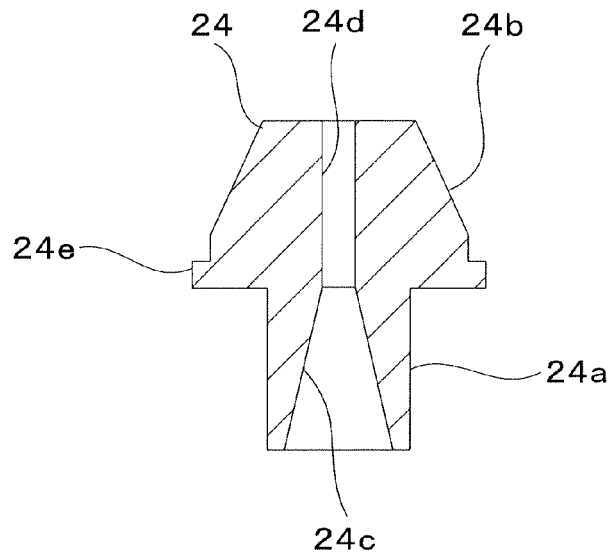
FIG. 5 is a sectional view of a cam follower in accordance with a second embodiment of the present invention.
Figure 6:
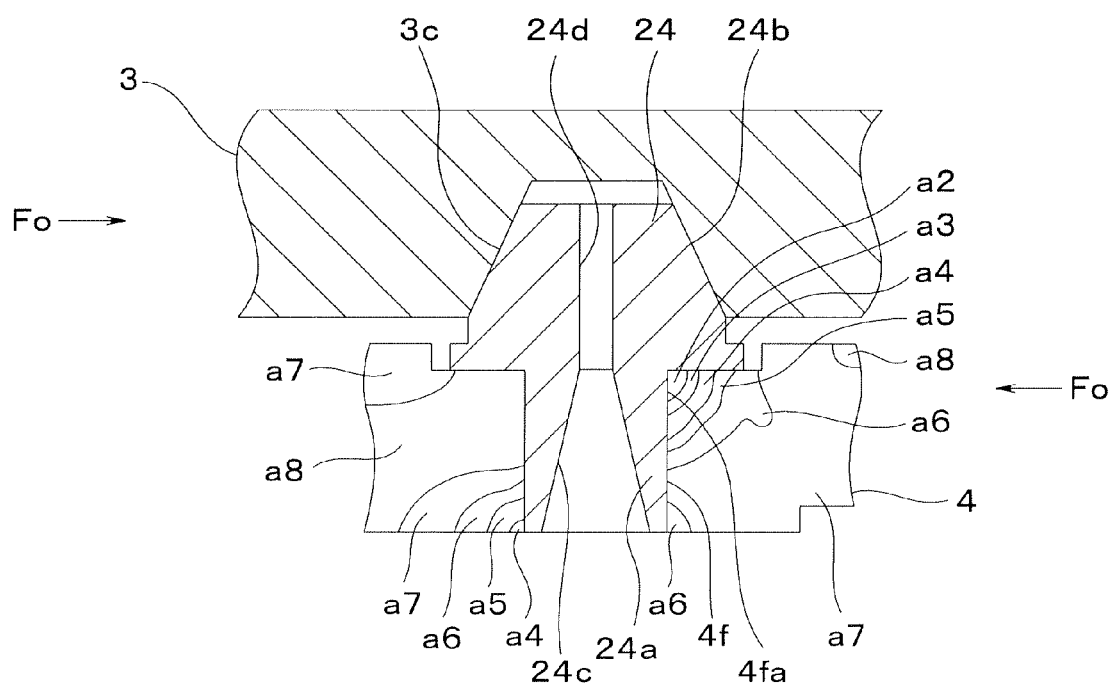
FIG. 6 is an enlarged sectional view taken along the optical axis around a cam groove and a cam follower of a lens barrel to which the cam follower shown in FIG. 5 is applied, additionally showing a stress distribution formed around a shaft hole in a moving frame, which is obtained by computer analysis of the state of stress concentration in the shaft hole at the time when a predetermined impact force acts.

FIG. 5 is a sectional view of the cam follower of the present embodiment, and FIG. 6 is an enlarged sectional view taken along the optical axis around the cam groove and the cam follower of the lens barrel to which the cam follower of the present embodiment is applied, additionally showing a stress distribution formed around the shaft hole in the moving frame, which is obtained by computer analysis of the state of stress concentration in the shaft hole at the time when the predetermined impact force F0 acts on the lens barrel.

The lens barrel to which the cam follower of the present embodiment is applied has the same configuration as that of the lens barrel 1 of the first embodiment excluding the cam follower. Therefore, the same symbols are applied to elements having the same configuration, and hereafter only different portions are explained.

A cam follower 24 of the present embodiment is made of a metal, and has a hollow shaft portion 24a fixed in the cam follower fitting shaft hole 4f by press fitting (or bonding), a slidably contacting portion 24b forming a taper-shaped slidably contacting surface that is in slidable contact with the cam groove 3c of the rotating frame 3, and a flange portion 24d. In the shaft portion 24a, a taper-shaped hollow hole 24c is provided, so that the wall thickness of this portion decreases gradually toward the shaft end. In the slidably contacting portion 24b, a straight-shaped hollow hole 24d that communicates with the hollow hole 24c and penetrates the slidably contacting portion 24b is provided (FIGS. 5 and 6). The flange portion 24d is not necessarily needed.

For the camera incorporating a lens barrel to which the cam follower 24 is applied as well, when the camera is in the state in which photographing can be performed, the first group frame 4 has moved to a put-out position projecting to the front. In case of accident in which the camera is dropped with the lens barrel side (front side) being the downside, the front end surface of the first group frame 4 collides with an obstacle such as the ground, and resultantly the lens barrel is subjected to an impact force (external force) F0 in the optical axis O direction. The impact force F0 acts on the engagement portion in which the shaft portion 24a of the cam follower 24 engages with the shaft hole 4f of the first group frame 4.

As shown in FIG. 6 showing a stress distribution at the time of application of the impact force F0 obtained by computer analysis, when the cam follower 24 of the present embodiment is applied, the degree of stress concentration near the fit inlet portion 4fa on the side of application of the external force of the shaft hole 4f is decreased as compared with the case where the conventional solid cam follower 53 shown in FIG. 8 is applied and further with the case where the cam follower 14 shown in FIG. 3 is applied. The stress aN (N=1 to 8) in each zone shown in FIG. 6 shows the same value as that of the aforementioned stress aN in FIG. 8, and the stress value decreases gradually from N=1 toward N=8.

The reason why the degree of stress concentration decreases in the case where the cam follower 24 is applied as described above is that the taper-shaped hollow hole 24c is formed in the shaft portion 24a, and this portion is deformed elastically, by which the impact force is further relieved easily.

As described above, according to the lens barrel to which the cam follower 24 of the present embodiment is applied, the shaft portion 24a of the cam follower 24 fixed in the shaft hole 4f of the first group frame 4 is made a hollow shaft having the taper-shaped hollow hole 24c. Therefore, when the lens barrel is subjected to the impact force, the shaft portion 24a is elastically deformed relatively easily, so that the impact force is absorbed further easily, so that the stress concentration of the shaft hole 4f of the first group frame 4 in which the shaft portion 24a is fittingly fixed decreases further. Therefore, the strength around the shaft hole 4f is secured, by which the coming-off of the cam follower 24 and the damage to the shaft hole 4f can be prevented. At the same time, the length of the shaft hole 4f can be decreased, so that the compactness of the lens barrel can be realized by decreasing the outside diameter of the first group frame 4.

Figure 7:
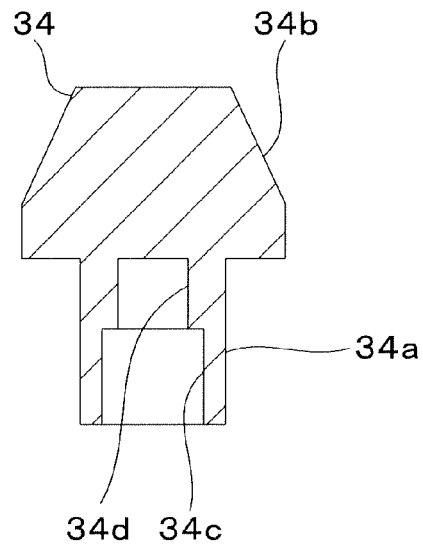
FIG. 7 is a sectional view of a cam follower in accordance with a third embodiment of the present invention.

Next, a cam follower in accordance with a third embodiment of the present invention is explained with reference to FIG. 7, which is a sectional view of the cam follower.

The lens barrel to which the cam follower of the present embodiment is applied has the same configuration as that of the lens barrel 1 of the first embodiment excluding the cam follower. Therefore, the same symbols are applied to elements having the same configuration, and hereafter only different portions are explained.

A cam follower 34 of the present embodiment is made of a metal such as free cutting steel, and has a hollow shaft portion 34a fixed in the cam follower fitting shaft hole 4f of the first group frame 4 by press fitting (or bonding) and a slidably contacting portion 34b forming a taper-shaped slidably contacting surface that is in slidable contact with the cam groove 3c of the rotating frame 3. In the shaft portion 34a, stepped hollow holes 34c and 34d having different inside diameters are provided in the axial direction. The shaft end portion of the shaft portion 34a has a thin wall (FIG. 7).

The inside portion of the shaft portion 34a of the cam follower of the present embodiment has two inside diameters. However, it may have more inside diameters.

For the camera incorporating a lens barrel to which the cam follower 34 is applied as well, when the camera is in the state in which photographing can be performed, the first group frame 4 has moved to a put-out position projecting to the front. In case of accident in which the camera is dropped with the lens barrel side (front side) being the downside, the front end surface of the first group frame 4 collides with an obstacle such as the ground, and resultantly the lens barrel is subjected to an impact force (external force) F0 in the optical axis O direction. The impact force F0 acts on the engagement portion in which the shaft portion 34a of the cam follower 34 engages with the shaft hole 4f of the first group frame 4.

For the camera incorporating the lens barrel to which the cam follower 34 of the present embodiment is applied as well, since the shaft portion 34a of the cam follower 34 fixed in the shaft hole 4f of the first group frame 4 is a hollow shaft having the stepped hollow holes 34c and 34d, when the lens barrel is subjected to the impact force, the impact force is absorbed by the elastic deformation of the shaft portion 34a in addition to the elastic deformation of the shaft hole 4f, and the stress concentration of the shaft hole 4f of the first group frame 4 in which the shaft portion 34a is fittingly fixed decreases. Therefore, the strength around the shaft hole 4f is secured, by which the coming-off of the cam follower 34 and the damage to the shaft hole 4f can be prevented. As a result, the length of the shaft hole 4f can be decreased, so that the compactness of the lens barrel can be realized by decreasing the outside diameter of the first group frame 4.

In the present embodiment, the explanation has been given of the case where the cam follower is made of a metal. However, in the case where the lens barrel is relatively light in weight, the cam follower may be manufactured of a light material such as a synthetic resin including POM or aluminum.

Also, in the present embodiment, the specific explanation has been given of the case where the cam follower engages with the cam groove. However, the cam follower of the present invention may be engaged by applying a circular groove or a straight groove in place of the cam groove.

As described above, for the cam follower and the lens barrel in accordance with the present invention, when the impact force is applied to the lens barrel, the cam follower fixed to the frame member is less liable to come off the frame member. Also, the cam follower or the lens barrel having less possibility of damaging the frame member can be used.

The present invention is not limited to the above-described embodiments. Besides, at the implementation stage, various modifications and changes can be made without departing from the spirit and scope of the invention. Further, the above-described embodiments embrace inventions at various stages, and various inventions can be extracted by an appropriate combination of a plurality of constituent features disclosed.

For example, even if some constituent features are deleted from all of the constituent features shown in the embodiments, in the case where the problems described in the section of Description of the Related Art can be solved, and the advantages described in the section of SUMMARY OF THE INVENTION can be realized, the configuration from which the constituent features are deleted can be extracted as the invention.

What is claimed is:

1. A cam follower for a lens barrel, comprising:
   a hollow shaft portion fixed to a frame member of the lens barrel; and
   a slidably contacting portion which is integral with the hollow shaft portion and is in slidable contact with a cam or a groove of another frame member moving relatively to the frame member to which the shaft portion is fixed,
   wherein the shaft portion has a stepped hollow hole having a plurality of different inside diameters in the axial direction.

2. A cam follower for a lens barrel, comprising:
   a hollow shaft portion fixed to a frame member of the lens barrel; and
   a slidably contacting portion which is integral with the hollow shaft portion and is in slidable contact with a cam or a groove of another frame member moving relatively to the frame member to which the shaft portion is fixed,
   wherein the shaft portion has a tapered hollow shape.

3. The cam follower for a lens barrel according to claim 2, wherein
   a straight hollow hole is further provided in the slidably contacting portion.

4. The cam follower for a lens barrel according to claim 1, wherein
   the hollow portion of the hollow shaft portion reaches the inside portion of the slidably contacting portion.

5. The cam follower for a lens barrel according to claim 1, wherein
   the cam follower is made of a metal.

6. A lens barrel comprising:
   a first frame member which moves;
   a cam follower having a hollow shaft portion and a slidably contacting portion integral with the shaft portion, the shaft portion being fixed to the first frame member; and
   a second frame member which has a cam or a groove with which the slidably contacting portion of the cam follower is in slidable contact and moves relatively to the first frame member,
   wherein the shaft portion has a stepped hollow hole having a plurality of different inside diameters in the axial direction.

7. A lens barrel comprising:
   a first frame member which moves;
   a cam follower having a hollow shaft portion and a slidably contacting portion integral with the shaft portion, the shaft portion being fixed to the first frame member; and
   a second frame member which has a cam or a groove with which the slidably contacting portion of the cam follower is in slidable contact and moves relatively to the first frame member,
   wherein the shaft portion has a tapered hollow shape.

8. The lens barrel according to claim 7, wherein
   a straight hollow hole is further provided in the slidably contacting portion.

9. The lens barrel according to claim 6, wherein
   the hollow portion of the hollow shaft portion reaches the inside portion of the slidably contacting portion.

10. The lens barrel according to claim 6, wherein
    the cam follower is made of a metal.

11. The cam follower for a lens barrel according to claim 2, wherein the cam follower is made of a metal.

12. The lens barrel according to claim 7, wherein the cam follower is made of a metal.

* * * * *